(12) United States Patent
Bloy

(10) Patent No.: US 6,661,378 B2
(45) Date of Patent: Dec. 9, 2003

(54) ACTIVE HIGH DENSITY MULTI-ELEMENT DIRECTIONAL ANTENNA SYSTEM

(75) Inventor: Graham P. Bloy, St. Louis, MO (US)

(73) Assignee: Locus Technologies, Inc., St. Louis, MO (US)

( * ) Notice: Subject to any disclaimer, the term of this patent is extended or adjusted under 35 U.S.C. 154(b) by 0 days.

(21) Appl. No.: 10/004,251

(22) Filed: Nov. 1, 2001

(65) Prior Publication Data

US 2002/0196185 A1 Dec. 26, 2002

Related U.S. Application Data

(60) Provisional application No. 60/244,990, filed on Nov. 1, 2000.

(51) Int. Cl.$^7$ ................................................. G01S 5/04
(52) U.S. Cl. ........................ 342/437; 342/428; 342/434; 342/374
(58) Field of Search ................................ 342/374, 437, 342/434, 435, 428

(56) References Cited

U.S. PATENT DOCUMENTS 5,146,230 A * 9/1992 Hules .......................... 342/374
6,184,828 B1 * 2/2001 Shoki ........................... 342/368

* cited by examiner

Primary Examiner—Theodore M. Blum
(74) Attorney, Agent, or Firm—Peter S. Gilster; Greensfelder, Hemker & Gale, P.C.

(57) ABSTRACT

Active high density multi-element antenna system [DS] for radiolocation of RF target radiation has a processor-controlled antenna array [CAA] having rings [R1, R2, R3] concentric about a central axis to define arcuate sectors $S_n$ about the central axis, each ring having adjacent p.c. boards [PC1, PC2, PC3] with PIN diode-switched antenna elements within sectors. The rings provide three rings [E1, E2, E3] of discrete dipolar elements, defining electrically isolated antenna units [$AS_m$], each radial to the central axis, of quasi-log-periodic configuration. Antenna units are switched in rotational sequence about the central axis to provide narrow beam signal selectivity, directionally rotatable about the central axis. An array control system [ACS] is operated, as under microprocessor control [34], by a host system [HS] to cause RF scanning. PIN diode switching is used on printed circuit boards within the array. Amplitude and phase comparison modes are used.

28 Claims, 9 Drawing Sheets

(KNOWN ART)

(KNOWN ART)

ACTIVE HIGH DENSITY MULTI-ELEMENT DIRECTIONAL ANTENNA SYSTEM

CROSS-REFERENCE TO RELATED APPLICATION

This application is based upon and claims the priority of provisional application Serial No. 60/244,990, filed Nov. 1, 2000, entitled Active High Density Multi-Element Directional Antenna System of the present inventor. Continued preservation of said provisional application is requested.

BACKGROUND OF THE INVENTION

Field of the Invention

The invention relates to antennas and, more particularly, to direction finding or radiolocation antennas and methods of radio direction finding as well as to radio tracking and radiolocation systems in general and to scanning for target signals within a band of frequencies.

Radio tracking, direction finding or radiolocation apparatus and technology are used for military and civilian uses, including for military and civilian rescue missions, military and security control and tracking and radiolocation missions, military and civilian police operations and for various other purposes where one desires to both quickly and precisely respond to targets or other sources of radio frequency (RF) and to pinpoint their location or their precise bearing relative to RF receiving apparatus.

Heretofore, there have been many antenna configurations and radio direction finding and radiolocation techniques and systems using specialized antennas. Chief among the requirements in the design of such devices and systems is that of accuracy in direction finding. In azimuthal direction finding, it is desired to identify with precision the azimuthal direction to a source of RF energy. When triangulation of RF sources is used for radiolocation of such sources, accuracy can be increased substantially. As used for emergency location, as in the radiolocation of downed aircraft, obtaining azimuth bearings to an RF source from different locations enhances the likelihood of successful location. But in combat situations, where a downed airman may be unable to transmit for long periods, whether by reason of avoiding detection by hostile forces or because of limited transmitting power reserve, or in high security operations including clandestine tracking missions where decreasing length of transmitting time reduces risk of detection by those engaged in possible criminal activities, so that the time of transmission necessarily must be limited and speed of responding by tracking, direction finding or radiolocation system must be rapid.

It will thus be evident that increasing the speed of detection of a tracking, direction finding or radiolocation finding antenna system allows marked reduction in the time of transmission required for transmitting.

In a context in which there must be tracking, direction finding or radiolocation of multiple targets, increasing the speed of detection of a direction finding antenna system opens the possibility to determining the direction and location of greater numbers of multiple targets.

In the United States, regulatory requirement for cellular telephone system user location for emergency purposes has been established. Regulations have been promulgated by licensing authority functions of government which, in effect, impose on operators of cellular telephone systems a requirement that cellular systems provide capability for location of cellular users making use of such cellular systems.

In such situations, it is desired to carry out radiolocation with extreme speed, yet without diminution in accuracy.

Heretofore, radio direction finding as been carried out by a multitude of techniques, including amplitude nulling, signal comparison, and by triangulation methods as well as by IFF (from the term, Identify Friend-Or-Foe) protocols, as have been employed for many decades, as secondary radar co-aligned with primary radar in air commerce and as also extensively long used in military applications, coupled with the use of transponders which return encoded and/or encrypted signals, and which may employ digital protocols, in response to transmitted interrogation signals.

Many antenna arrays and configurations such as Yagi-Uda arrays and log-periodic or quasi-log-periodic arrays are known which have useful forward gain and directivity can be employed for receiving or transmitting signals relative to a known direction but their use heretofore has typically involved the use of arrangements for rotating such arrays, whether used alone, or in stacked configuration, or in phased relation, so as to selectively physically orient the array or arrays as by beam or mast rotation. Such physical orientation of arrays is not conducive to high-speed radiolocation, radio direction finding or scanning.

It has also been known to use so-called curtain antennas, which may include phased elements with selectively switchable reflectors to allow beam alignment, but the physical limitations and lack of mobility of such curtain antennas conducive to economical, highly mobile, field-usable, broadband high-speed radiolocation, radio direction finding or scanning.

Phased arrays have also been used extensively for radar, being particularly useful for target acquisition and tracking in military and aircraft uses, particularly at gigahertz frequencies, but the complication, cost and control complexity of such arrangements are typically not well-suited for cost-effective, readily portable or mobile, field-usable, broadband high-speed radiolocation, radio direction finding and scanning and particularly in VHF bands and low UHF bands.

Log-periodic antenna configurations and theory are of particular interest for adaptation to the presently inventive array, as log-periodic (LP) antenna structures offer the promise of wide frequency range if not frequency-independent (FI) consideration over a wide range of frequencies. Log-periodic antenna (LPA) theory and design is well-treated in the literature, and the characteristics of LPA constructions and quasi-log-periodic (QLP)variations thereof are succinctly and elegantly treated in P. E. Mayes, *Proc. IEEE,* vol. 80, no. 1, January 1992 ("Mayes" herein). In this important paper, portions of which originally appeared in Y. T. Lo and S. W. Lee, *Antenna Handbook, Theory, Applications, and Design.* New York: Van Nostrand Reinhold, 1988, cited infra. Prof. Mayes cautions that the term frequency-independent (FI) is reserved for antennas that have no theoretical limitation on the bandwidth of operation. He observes that, practically, for such antennas performance cannot be even approximately constant for all frequencies for, as he points, out, there are physical bounds that limit the band over which the performance can be held almost constant. He observes that between the band limits the performance varies in a manner periodic with the logarithm of the frequency, so that these antennas are often called logarithmically periodic or log-periodic (LP) antennas. To be considered FI, Dr. Mayes instructs that for such antenna structures variation with frequency of all pertinent measures of electrical performance must be negligible between band limits that can be very widely spaced, even 100:1 or more. However, he points out that useful performance over a narrower, although very broad, band may be achieved after relaxing some structural requirements related to true frequency independence, adding that in some cases the resulting antennas perform the same as true FI antennas, but only over a limited bandwidth that cannot be easily extended. In other cases, he observes that performance may be noticeably affected by changing frequency over the operating band. These changes may not be deleterious, he allows, noting that they may even be advantageous in certain applications. Antennas with minor departures from the geometric requirements for FI performance are denoted by Mayes as being sometimes called quasi-log-periodic (QLP).

In the presently disclosed system, novel log-periodic antenna printed circuit structures are employed for forming an active high density multi-element antenna system of the invention, wherein elements formed in the array may be considered to be in sets of elements within the array, and where the elements specifically in dipolar form oriented for vertical polarization, but insofar as the number of elements, geometry, spacing, and relation to other elements within the array as well as in relation to electrical isolation elements within the array, constitute deliberate departures from true FI configuration, being suited for operation over a wide band of frequencies, elements of arrays of the invention may be more strictly regarded as QLP in design. For the purposes of this application, the term log-periodic as applied to the present invention is deemed also to include the term quasi-log-periodic, but a further distinction herein is not believed necessary.

In general terms the geometry of an FI antenna is viewed by Mayes as consisting of multiple adjoining cells, each being scaled in dimensions relative to the adjacent cell by a factor that remains fixed throughout the structure. According to the theory elucidated by Mayes, the cells may be two- or three-dimensional. If $D_n$ represents some dimension of the nth cell, and $D_{n+1}$ is the corresponding dimension of the (n+1)th cell, then the relation $$\frac{D_{n+1}}{D_n} = r$$

holds according to Mayes for all applicable values of the integer n. The constant r is called by Mayes the scale factor, and Mayes notes that lower values of the index n usually refer to the larger cells, so that r<1.

Mayes recognizes dipole log-periodic antennas as a subset of log-periodic antennas. The theory of log-periodic dipole arrays may be further understood not only from Mayes but also from the following literature preceding Mayes and thus of not greater temporal significance or relation to the present disclosure:

[1] E. C. Jordan, G. A. Deschamps, J. D. Dyson, and P. E. Mayes, "Developments in broadband antennas," *IEEE Spectrum*, vol. 1, pp. 58–71, April 1964.

[2] D. E. Isbell, "Non-periodic dipole arrays," *IRE Trans. Antennas Propagat.*, vol. AP-8, pp. 260–267, May 1960.

[3] R. L. Carrel, "Analysis and design of the log-periodic dipole array," Tech. Rep. 52, Univ. Illinois Antenna Lab., Contract AF33(616)–60719, October 1961.

[4] Y. T. Lo and S. W. Lee, *Antenna Handbook, Theory, Applications, and Design*. New York: Van Nostrand Reinhold, 1988.

[5] W. M. Cheong and R. W. P. King, "Log-periodic dipole antenna," *Radio Sci.*, vol. 2, pp. 1315–1325, November 1967.

[6] J. Wolter, "Solution of Maxwell's equations for log-periodic antennas," *IEEE Trans. Antennas Propagat.*, vol. AP-18, pp. 734–741, November 1970.

[7] G. DeVito and G. B. Stracce "Further comments on the design of log-periodic dipole antennas," *IEEE Trans. Antennas Propagat.*, vol. AP-21, pp. 303–308, May 1973.

[8] G. DeVito and G. B. Stracce, "Further comments on the design of log-periodic dipole antennas," *IEEE Trans. Antennas Propagat.*, vol. AP-22, pp. 714–718, September 1974.

[9] P. C. Butson and G. T. Thompson, "A note on the calculation of the gain of log-periodic dipole antennas," *IEEE Trans. Antennas Propagat.*, vol. AP-24, pp. 105–106, January 1976.

Mayes treats the theory of log-periodic dipole (LPD) antenna arrays. For purposes of comparative theoretical analysis, the Mayes terminology "LPD array" is herein used in the same general sense as an antenna unit, herein designated AS, of the present invention. Such a comparison is merely used for convenience to understand the electrical relationship of antenna units of the present invention. An LPD array is depicted in FIG. 10 according to the symbology and taxonomy of Mayes, wherein the element geometry can be described by the scale factor, r, and the angle, α, between the centerline and the tips of the dipoles. The definition of r used by Carrel [reference 3, supra] is, as characterized by Mayes, the ratio of the lengths of two adjacent dipoles; but the feeder between adjacent dipoles of an LPD is transposed. Hence, each cell of such a Mayes LPD may be considered to contain a pair of dipoles. Phasing associated with transposed feedline conductors is termed necessary by Mayes to produce FI performance.

Such LPD arrays can be analyzed, according to theory of Mayes, by separating the dipoles and transmission line, i.e., feedline, from which signals are either received from or transmitted to the LPD array. The terminal properties of an N-element network of dipoles can be represented by an N×N impedance matrix. Carrel [reference 3, supra] used the formulas of the induced EMF method to calculate the impedance matrix; while according to Mayes, later work [references 5 through 8, supra] used moment methods, Mayes takes the view that results of the several techniques are not appreciably different [reference 9, supra]. Computed amplitude and phase of the terminal currents in the several dipoles of an LPD array are shown by Mayes in FIG. 11. The input currents of a few dipoles near the half-wave resonant length are significantly larger than those of any of the others. These dipoles with highest currents are collectively called by Mayes the "active region" and produce most of the radiated field; or in the present context, in which duality of receiving and transmitting and be said to exist for purposes of analysis, may be considered those elements which most greatly contribute received RF.

When frequency is changed, the active region will move along the axis of the LPD. The dimensions in wavelengths of the active region remain almost constant. Hence, within the operating band the radiation pattern is insensitive to the frequency changes. The pattern will begin to change when the active region encounters either of the two truncation points. The band of F1 patterns is, therefore, somewhat less than the ratio of the longest-to-shortest dipole lengths.

SUMMARY OF THE INVENTION

The present invention is concerned with precision in radiolocation, scanning and direction finding by the use of a receiving antenna system, and may be used for radiolocation of a wide variety of transmitting signal sources, whether modulated or not, and whether encoded or encrypted or not.

Among the several objects, features and advantages of the invention may be noted the provision of an advantageous system for scanning, radiolocation, and direction finding relative to single or multiple target transmitters, i.e., sources of RF emission, whether identified or unidentified; which system is which cost-effective, readily portable or mobile, field-usable, and broadband in operation; which operations with high speed scanning techniques to provide precise radiolocation and/or radio direction finding and scanning and tracking; and which is particularly well-suited for economical and effective use at VHF and UHF frequencies; which can be used with different types of host systems or may provide radiolocation data, as well as other information, including demodulated data from target sources, for various purposes.

The presently proposed system relates to an controlled active high density multi- element directional array for providing scanning, radio tracking, direction finding and/or radiolocation. Apparatus and methodology of the invention is useful for military and civilian uses, including rescue missions, military and security control and tracking and radiolocation missions, and for other military and civilian police operations.

The new system can be used for various other purposes where it is desired to both quickly and precisely respond to targets or other sources of RF and to pinpoint their location or their precise bearing relative to RF receiving apparatus.

Among the important attributes of the new system is its accuracy in direction finding and radiolocation in providing capability to identify with high degree of precision the azimuthal direction to a target source of RF energy.

When triangulation of target RF sources is desirable for radiolocation of such sources, accuracy can be increased substantially by the new system, with enhancement of the likelihood of precise location, such may enable tactical or emergency teams to move with speed and precision to the location of a target transmitter.

The new system is useful in combat situations in which a downed airman or crew may be unable to transmit for long periods, whether by reason of avoiding detection by hostile forces or because of limited transmitting power reserve.

Further the proposed system may be employed in high security operations including clandestine tracking missions where decreasing length of transmitting time reduces risk of detection by those engaged in possible criminal activities, so that the time of transmission necessarily must be limited. In such uses, the new system offers high speed of response by microprocessor implemented and/or host system initiated tracking, direction finding or radiolocation system to achieve rapid reporting of radiolocation and other data.

The new system allows marked reduction in the time of transmission required for transmitting in such situations as, for example, in tactical and rescue missions.

The system described herein facilitates tracking, direction finding or radiolocation of multiple targets, increasing the speed of detection of a direction finding antenna system; and thus the system allows for determination of direction and location of greater numbers of multiple targets.

The inventive system may be employed in meeting regulatory requirements in the USA and elsewhere for cellular telephone system user location for emergency purposes has been established. Thus, the inventive system can be used at cellular telephone sites at which antenna units of the present system are to be co-located with cellular site transmission and reception facilities to provide a high-accuracy capability of locating and tracking cellular users. Each of the several possible cellular sites ("cells") of a cellular system may be equipped with a system of the presently proposed type for allowing r, θ location determination tracking of cellular users so as to provide the cellular system with the capability of identifying the location of each user, and extracting the position in the form of location data. In the foregoing notation, the terms r, θ connote distance and azimuth location data of a target transmitter source relative to the controlled antenna array of the new system.

In such uses, the location data is then made available by the inventive new system to a host system such as a cellular communication system so as to be shared with multiple cell sites and reported centrally as for locating to police or emergency equipment the location of the user of cellular equipment.

In these various uses and situations, the new system carries out scanning and radiolocation of targets, and also permits tracking of targets with extreme speed, yet without diminution in accuracy, as for use by government and non-government agencies, and by military or strategic operations, detective and investigative agencies, and law enforcement, and in both covert or overt operations. In the commercial segment, the system has potential use for identifying the location of pieces of equipment, e.g., rail units, mobile units, or vehicles carrying specialized or sensitive cargo.

The present invention provides a novel low-loss, digitally-controlled system for providing a high speed omnidirectional, high accuracy radiolocation and precise radio direction scanning, finding. The system includes an active high density multi-element directional controlled antenna array of components configured as sectored sets of log-periodic antenna units under the control of an array control system which in turn may be under the control of a host system. The controlled antenna array is operated under the command of the array control system in such a way as to be able to radiolocate with a high degree of precision one or more possible target transmitters, i.e., target sources of RF by using circular scanning of extreme speed.

The present invention employs antenna elements having a log-periodic arrayed relationship and may alternatively employ antenna elements configured as according to Yagi-Uda arrays, sometimes referred to as Yagi arrays.

The sources may represent mobile or fixed units, persons, cellular telephone users, transmitters used for tracking, security or telemetry purposes, and myriad possible sources of RF energy capable of being received and used by the system and which it is desired to radiolocate of otherwise track by means of the system Each antenna unit is capable of being switched in and out by PIN diodes under microprocessor control of array control system of the overall system, to provide direction finding, radiolocation or scanning with substantial antenna gain over a wide band of frequencies, such as from the order of 300 MHz to 3000 MHz, and specifically especially useful over the range of about 450 MHz to 1000 MHz which includes broad sectors of commercial radio frequencies as well as cellular telephone frequencies.

Briefly, the invention more formally comprises, or consists of, or consists essentially of, an active high density multi-element antenna system for radiolocation by identification of the direction of RF radiation from one or more target sources, wherein the system includes antenna elements configured in multiple rings about a central axis to define arcuate sectors about the central axis, each of the rings including a plurality of adjacent discrete antenna elements within each sector, and each of the elements in the concentric rings have mutual relation to corresponding elements in at least one other of the concentric rings, such that corresponding elements in the multiple rings define respective antenna units which are radial to the central axis. Each of the antenna units is selectively operatively enabled or selectively operatively disabled in rotational sequence about the central axis to provide signal selectivity in a narrow beam pattern or width defined by the respective antenna units and whereby the selectivity is rotatable about the central axis. Means is preferably provided for electrically isolating each of the antenna units from adjacent antenna units.

Method aspects of the invention are also disclosed, and are treated more fully after discussion of the system and its features and use.

Feedpoints for each of the antenna units for receiving received RF signals from the respective antenna units when enabled, and provide such received signals to an array control system.

The array control system is operated, as under microprocessor supervision as initiated, for example, by a host system, for causing RF scanning by controllably enabling and disabling the antenna units. The RF scanning of the antenna units is thus carried out about the central axis. It is also carried out within a least a selected one of the sectors, the array means being operable for identifying which antenna unit within the selected sector is representative of an azimuth representing the direction to the target source.

As will become apparent, both amplitude and phase comparison modes are used in the scanning and radiolocation operations provided by the new system.

From a method perspective, the invention more formally comprises, or consists of, or consists essentially of a method of scanning and radiolocation of one or more target sources of RF radiation comprising providing a high density multi-element antenna system having antenna elements configured in multiple rings about a central axis to define arcuate sectors about the central axis, each of the rings including a plurality of adjacent discrete antenna elements within each sector, and each of the elements in the concentric rings have mutual relation to corresponding elements in at least one other of the concentric rings, such that corresponding elements in the multiple rings define respective antenna units which are radial to the central axis, and an array control system therefor, and operating the control system to provide at least:

first mode scanning of the antenna units about the central axis in a received RF amplitude sensing mode within a least a selected one or more of the sectors selectively operatively enabling or selectively operatively disabling the antenna units in rotational sequence about the central axis to provide signal selectivity in a narrow beam width defined by the respective antenna units and whereby the selectivity is rotatable about the central axis, and second mode scanning of the antenna units about the central axis in a received RF phase sensing mode within a least a selected one or more of the sectors operating the control system to provide identification which antenna unit within the selected sector is most closely representative of an azimuth representing the direction to the target source.

The preferred methodology includes alternating between the first and second modes.

More specifically, the methodology preferably involves scanning sectors of the array, wherein there is repetitive scanning about the complete circle of the array in the amplitude sensing mode to identify a maximum signal sector, then converting to said second mode scanning, and therein comparing received signal phase as between diametrically opposed pair antenna units until a closest possible phase comparison identifies which of the opposed pairs of log-periodic antennas is most closely aligned with the received signal.

BRIEF DESCRIPTION OF THE DRAWINGS

Corresponding characters indicate corresponding parts throughout the drawings.

DETAILED DESCRIPTION OF PRACTICAL EMBODIMENT

Figure 1:
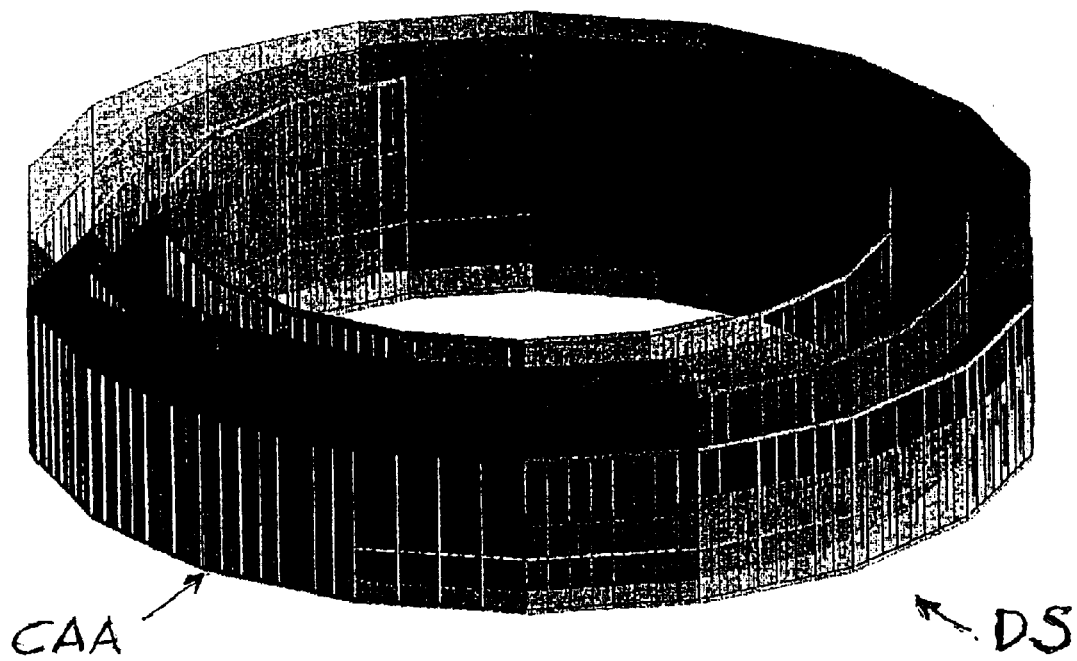
FIG. 1 is a perspective view of an active high density multi-element directional antenna system illustrating its high density multi-element antenna array in accordance with and embodying the present invention. Certain dipolar elements shown forming the array are shown greatly reduced in number for clarity of illustration.
Figure 5:
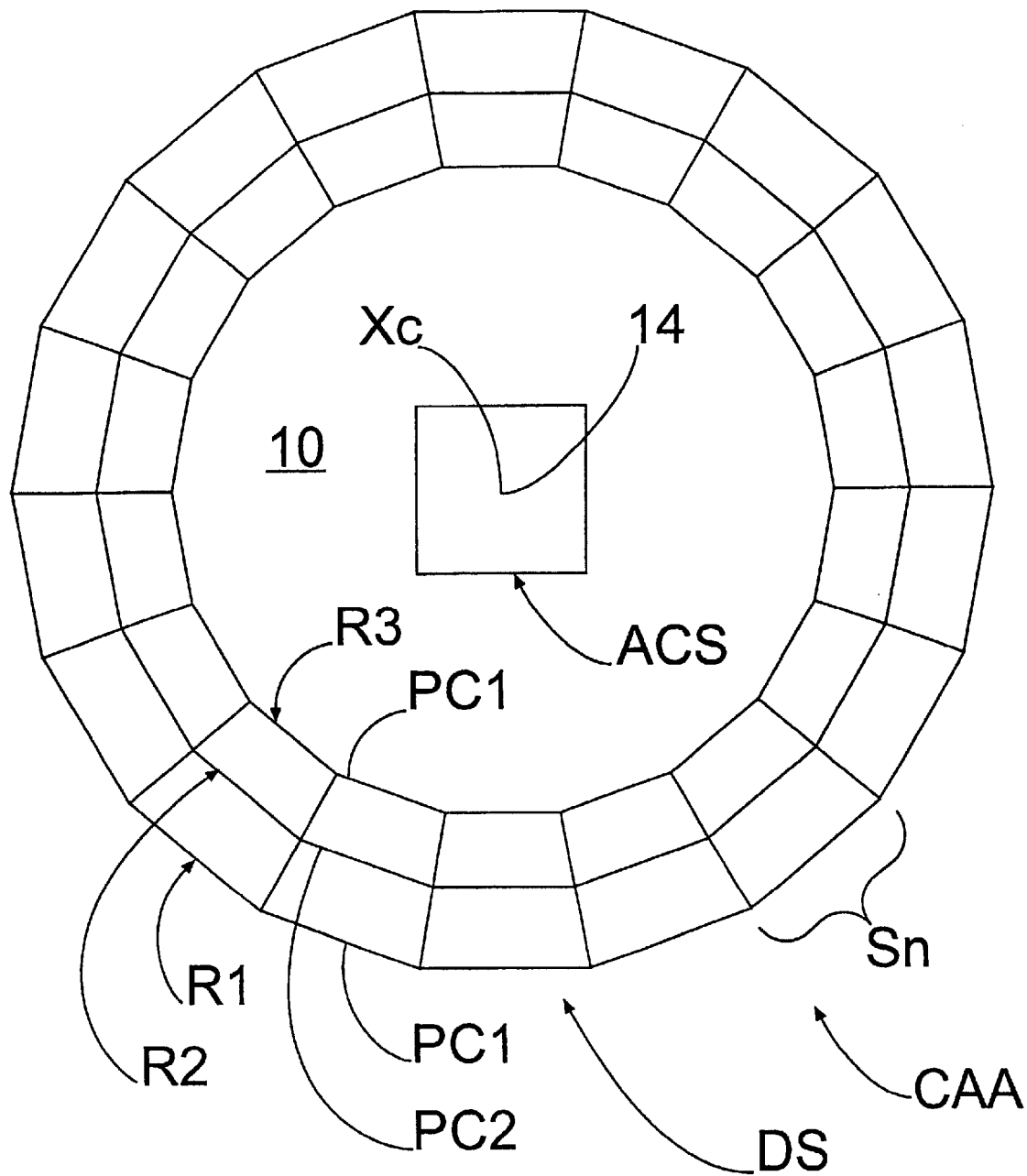
FIG. 5 is a top plan view of the array, showing its sectors.

Referring to the drawings FIGS. 1 and 5, an active high density multi-element directional antenna system DS of the invention is a controlled antenna array CAA generally designated CAA of especially configured sectored sets of antenna which are under the control of an array control system generally designated ACS which may be under the control a host system HS such as may include one or more cell sites of a cellular telephone system. As another possibility, host system HS may form part of or may represent an interconnected or networked system, which in turn may incorporate multiple such systems.

General Features of the System

Controlled antenna array CAA is operated by array control system ACS in such a way as to be able to radiolocate with a high degree of precision any of one or more possible target transmitters T1, T2, . . . Tn. The target transmitters may represent any possible transmitting entity, whether transmitting momentarily, periodically, or for given duration, or according to a known or unknown schedule or a random schedule, which may need to be radiolocated, i.e., located by system DS, not only with precision but with extreme speed. It will accordingly be understood that target transmitters T1, T2, ... Tx, where x represents a maximum number of target transmitters to radiolocate.

All such transmitters may be referred to as target sources. The sources may represent mobile or fixed units, persons, cellular telephone users, transmitters used for tracking, security or telemetry purposes, and myriad possible sources of RF energy capable of being received and used by the present system and which it is desired to radiolocate of otherwise track by means of the system.

Figure 2:
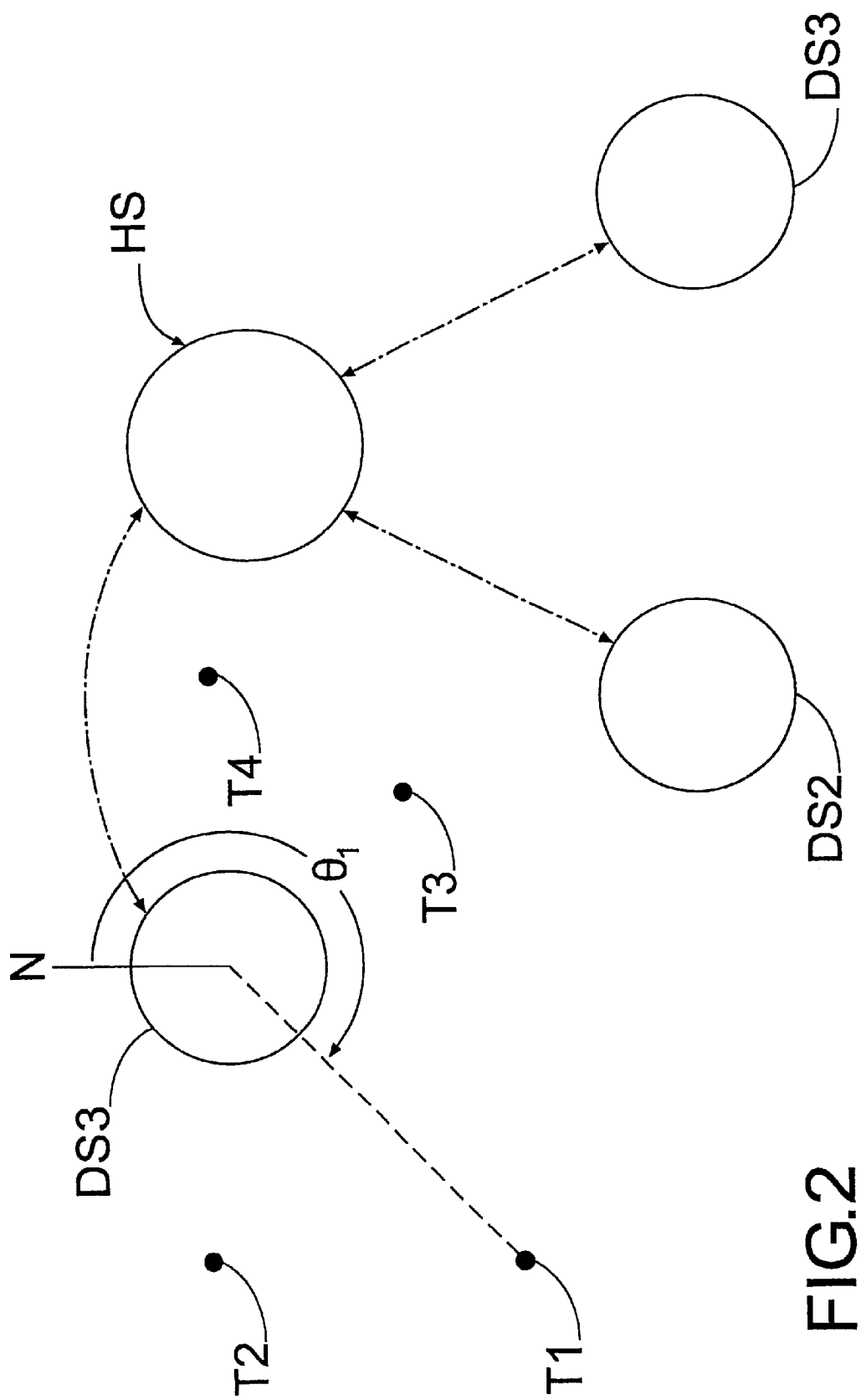
FIG. 2 is a plan view showing the relationship of the system of FIG. 1 to target sources of RF signals to be detected and radiolocated by the system, including the relationship to other systems.

Referring to FIG. 2, system DS is represented as system DS1 in an overall system including a host system HS which may include comparable or identical other systems of the invention designated DS2, DS3, ..., all intended to be controlled by host system HS and connected by radio link, cable, fiber optic or other communication with host system HS for causing the systems DS1, DS2, DS3, ..., to respond to host system HS for scanning and radiolocation of any of various possible target sources T1, T2, T3, .... These target sources may be located remotely from any one of the systems, such as for example, the system presently described, which is used for illustration. It will be understood that the present system can be responsive to a momentary, intermittent or continuous signal from any of the target sources, such as that designated and used herein for example, at T1. The present system scans for and is responsive to a radio transmission from source T1 to determine the relative azimuth $\theta_1$ relative to true or magnetic north, as specified, and report such azimuth to host system HS. If any target source is also within range of the receiving capabilities of systems S2, S3, ..., then those systems may be instructed to report the azimuth to host system HS. The relative replacement of such systems DS, DS2, DS3, and so forth, relative to host system HS is not intended by FIG. 2 to be typical or representative of a specific installation. Rather, FIG. 2, represents merely one of many possible relative configurations coming including configurations in which a system of the invention colocated with host system HS.

Controlled antenna array CAA of the system is preferred to be capable of broadband capability, being capable receiving and responding to RF transmissions over a wide frequency range in multiple bands, so that the array can be receptive to various kinds of target sources, which may be single targets such as representative target T1 or multiple targets as shown. Merely for purposes of illustration, the system frequency range may include portions of the VHF band, the UHF band, or both the VHF and UHF band. such as from the order of 300 MHz to 3000 MHz, and specifically especially useful over the range of about 450 MHz to 1000 MHz which includes broad sectors of commercial radio frequencies as well as cellular telephone frequencies.

Specific Features of the System

Figure 6:
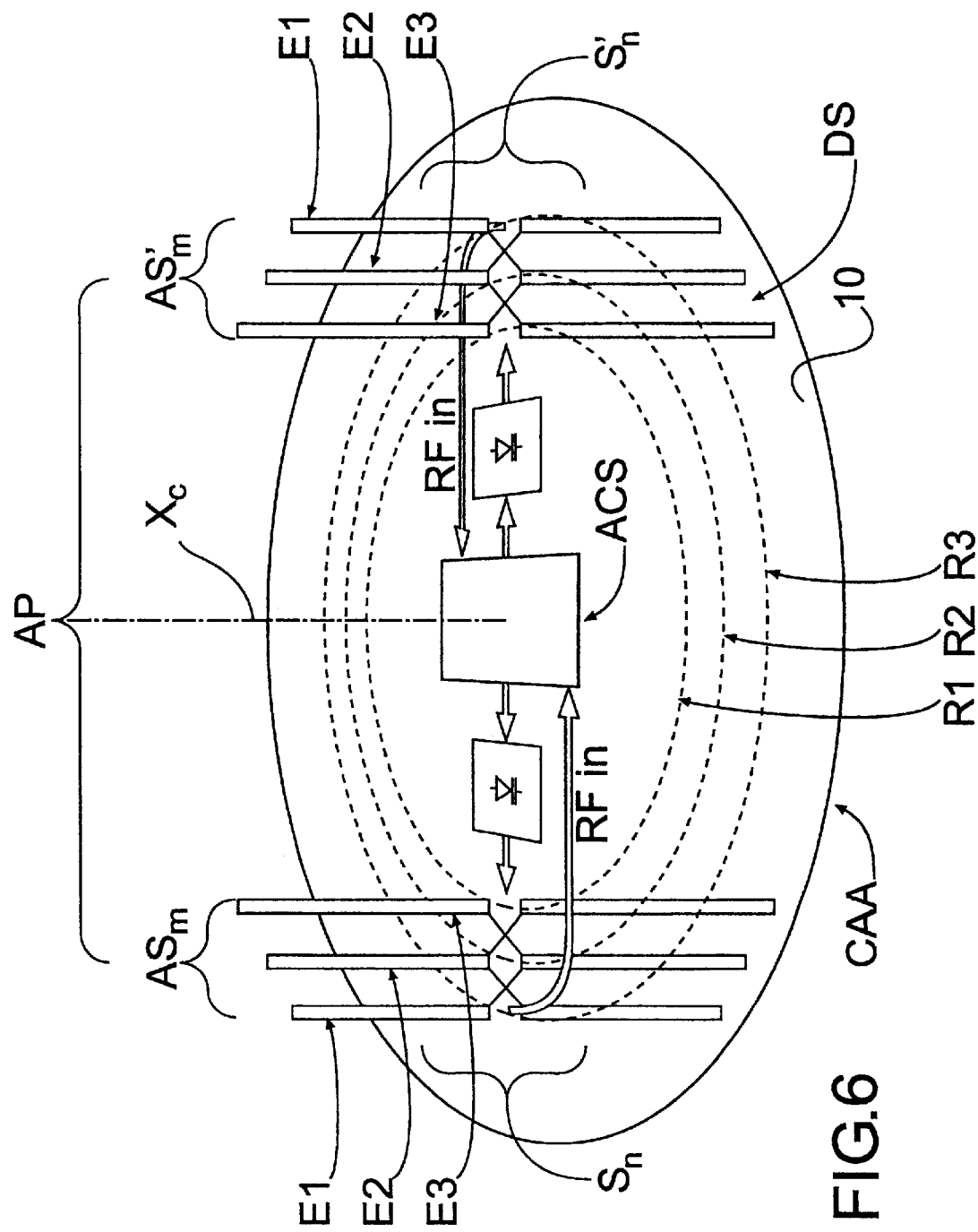
FIG. 6 is a simplified view of components of the array, showing relative positioning of certain of its components.

Referring now also to FIG. 6, the simplified illustration therein of controlled antenna array CAA shows a flat circular base 10 on which the array is formed, and on which log-periodic (or more strictly quasi-log-periodic) antennas are presented in perpendicular relationship about the periphery of base 10. Base 10 may also carry centrally key portions or the entirety of array control system ACS the components of which may be carried on ACS module or circuit board 12, here shown as rectangular but which may be circular like base 10 or may have distributed modular components carried above or below base 10 according to design specifications preferred for a given installation or as may be governed by taking into account desirable lead lengths of coaxial cables, waveguides or other connectors by which antenna elements of array CAA are interconnected with array control system ACS. Each log-periodic arrayed grouping of antenna elements is referred to for convenience as an antenna unit or set AS. Each antenna unit AS may be viewed or considered as a single active element with preferably a single feedpoint. Only an opposed pair of antenna units or sets $AS_m$ and $AS_{m'}$, each forming a log-periodic antenna, are here shown.

Each log-periodic antenna unit is in turn comprised of interconnected elements. More specifically, although controlled antenna array CAA has a predetermined large number of many such antenna sets AS. In FIG. 6, the single antenna unit $AS_m$ and diametrically opposite corresponding single antenna unit $AS_{m'}$, which is to say located and oriented precisely 180 degrees apart, together represent pairs of such diametrically opposed log-periodic antennas. Therefore, appreciate that the direction of predominant gain of antenna unit $AS_m$ and opposite antenna unit $AS_{m'}$ face in opposite directions radially outwardly from the center of base 10, which defines a central vertical axis $X_c$ perpendicular to base 10 which typically may be horizontal, but may be otherwise oriented as described later.

Antenna unit or set $AS_m$ is accordingly to be taken as representative of each of the many antenna sets AS, and where m connotes an integer from unity through the maximum number $m_{tot}$ such as 360, 720, 1440, or 3600 of such antenna units.

The log-periodic antenna units employed exhibit not only moderately high forward gain over a broad frequency range but also have the characteristic of front-to-back ratios usable for the present purposes, in that any given antenna unit $AS_m$ and its opposite antenna unit $AS_{m'}$ both may provide useful gain under conditions of usage discussed below for certain phase comparison herein discussed, yet nevertheless allowing comparison of signals from each to enable ambiguity of direction to a target transmitter to be resolved readily.

Figure 3:
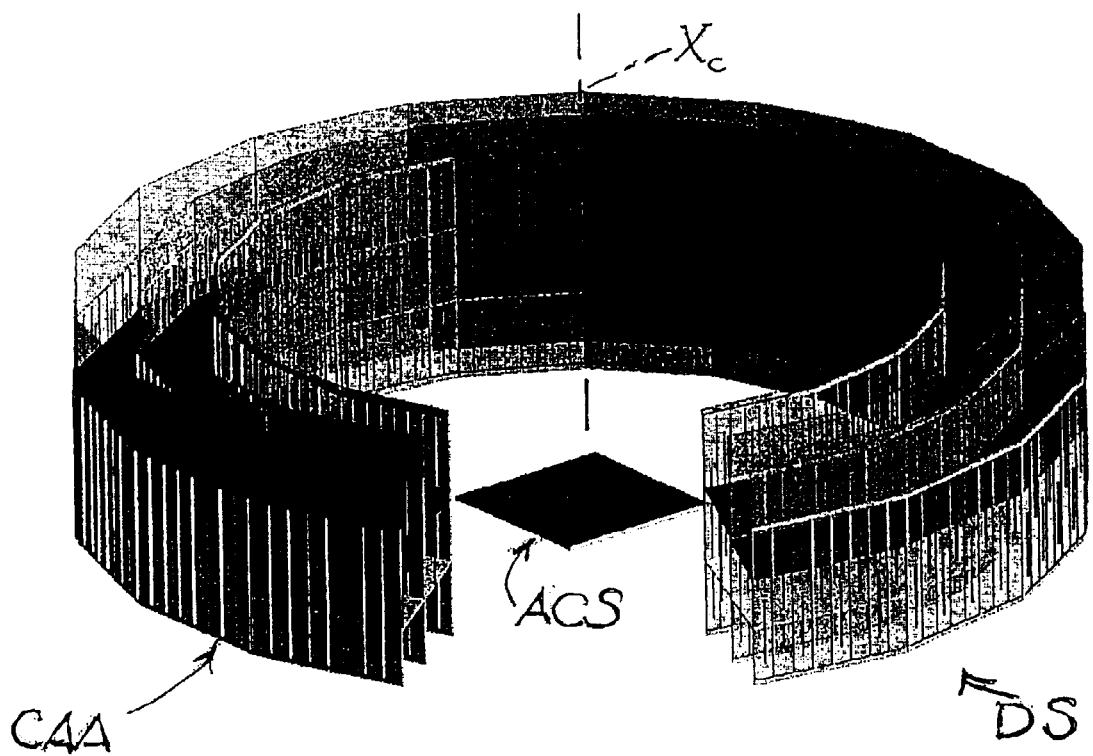
FIG. 3 is perspective view, similar to FIG. 1, partially cut away, to show relationships of components of the array.
Figure 4:
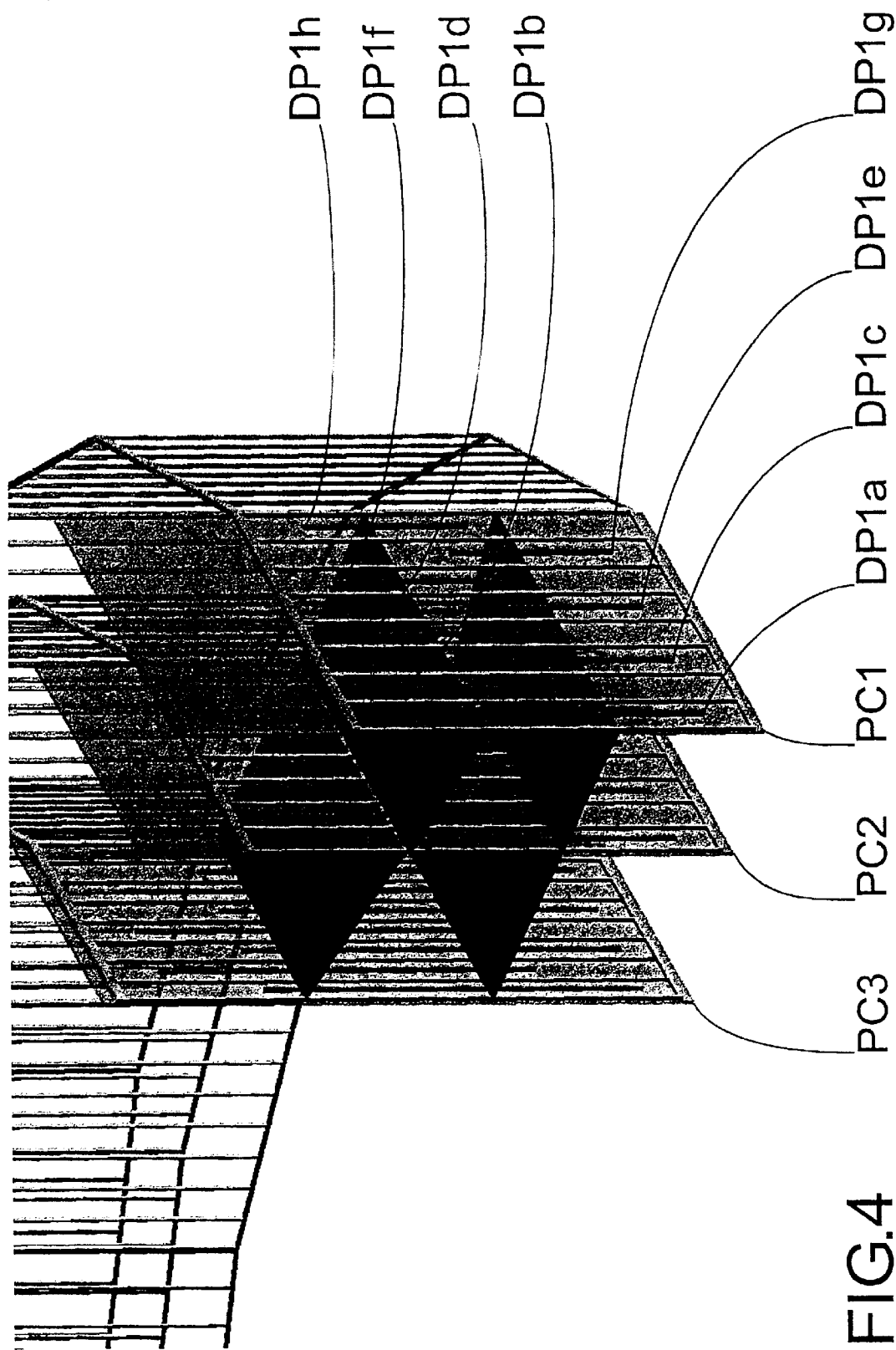
FIG. 4 is a fragmentary view thereof, illustrating features of a sector of the array, but in which the number of dipolar elements used in forming the array has also been greatly reduced for clarity of illustration.

Referring to FIGS. 1, 3 and 4, the dipolar elements which make up each antenna unit AS are provided by printed circuit board arrays arranged in identical sectors $S_m$, and can be sequentially identified as $S_1, S_2, \ldots, S_M$ beginning with an arbitrary sector, where n is an integer from 1 to M, and where M is the possible total sectors, such as 18 in number. Each sector represents a predetermined arcuate extent, as for example, each being of 20 a degrees of arcuate, i.e., azimuthal extent. Within each segment, the antenna units AS thereof are each formed of dipolar elements in vertical standing relation so that for the embodiment described each dipolar element of may constitute or represent one degree of azimuthal span or wherein multiple dipoles (such as 2, 5, or 10 in number) may constitute one degree of azimuthal span, such as corresponding to direction finding accuracies to as little as 1.0 degree, 0.5 degrees, 0.25 degrees or 0.1 degrees).

Each Antenna unit or set $AS_m$ is comprised of three sets E1, E2, E3 of dipolar elements. Spacing and length of these elements is discussed below.

In a first preferred practical embodiment the respective sets E1, E2, E3 of dipolar elements are realized by metallized areas on radially spaced printed circuit boards of phenolic, epoxy, composite, Mylar, or other synthetic resin dielectric material, where each sector thus includes printed circuit boards PC1, PC2, PC3 radially spaced apart to define the spacing referred to above between the three sets E1, E2, E3 of dipolar elements which make up each antenna set or unit $AS_m$. FIG. 4 shows planar printed circuit boards each carrying, for simplicity, only eight of a possible number of dipole pairs DP1a,b, ... h per sector, are shown arranged in staggered relationship, being alternatively low and high on the essentially vertical printed circuit board, wherein board PC1 is considered typical. It will be understood that the reduced number of dipolar elements illustrated is shown only for clarity of illustration, compared to a preferred number such as 20 or more across each sector.

When viewed in plan as in FIG. 5, each of the sets E1, E2, E3 of dipolar elements together define respective concentric rings or ranks R1, R2, R3 which are 18-sided polygons because the printed circuit boards are flat, as is convenient for mass production and as conduces to economy of assembly without substantially degrading accuracy for some uses. Said printed circuit boards may instead be outwardly convex, relative to a center 14 coincident with central vertical axis $X_c$ (see FIG. 5) of the circular controlled antenna array CAA and may most preferably be sections of a cylinder so that concentric rings R1, R2, R3 are each circular.

Thus, it is to be seen that each sector S is pie-shaped, so that printed circuit boards PC1, PC2, PC3 forming each sector are progressively smaller in arcuate extent, and the dipolar elements thereon are progressively more closely spaced in concentric rings R1, R2, R3.

Extending between the concentric rings R1, R2, R3 are further printed circuit boards for each sector S. Referring to FIGS. 4 and 5, it will be seen that for each sector S there are in actuality two printed circuit boards P1a, P1a', spaced above base 10 at locations generally proximate the midpoint of the sets of dipolar elements. Located on circuit boards P1a, P1a' are electronic switching components including PIN diodes under the supervision of array control system ACS for selectively enabling and disabling the dipolar elements.

More specifically, each log-periodic antenna unit AS is capable of being switched in and out by respective PIN diodes (representatively shown in FIG. 6) for each log-periodic antenna unit AS, according to established principles, under microprocessor control of array control system ACS to permit selectively circular enablement of the antenna units for scanning purposes as according to a protocol more clearly defined below. Such diodes, as at $D_m$, are located on the respective printed circuit boards P1a, P1a' in proximity to Each antenna unit AS is capable of being switched in and out by the PIN diodes under microprocessor control of array control system ACS of the overall system, to provide direction finding, radiolocation or scanning with substantial antenna gain over a wide band of frequencies.

Within each ring, adjacent apertured dipoles are located in alternatively staggered relationship, such that although they may be oriented instead in or non-staggered relationship.

The dipoles are formed by printed circuit elements laid on dielectric material forming the substrate of printed circuit boards constituting each arcuate sector. Metallized areas surround each diode, whether in staggered or non-staggered relation, for windowed isolation.

The spacing between each of the printed circuit circles varies according to the log-periodic relationship between elements of the boards, as according log-periodic relationships which are be derived from antenna theory. There is a respective active dipole element, which may more aptly be termed active element, on each respective board of the arrays, and there are corresponding mirror image relationships for each active element for each printed circuit on opposite sides of the central vertical axis $X_c$ of the circular array, so that for each antenna unit AS there is a corresponding opposite antenna unit AS' to provide accordingly antenna pairs AP (FIG. 6). As there are a total of N antenna units AS, in M sectors, the antenna units AS they are individually identified as $AS_n$ where n is an integer from 1 to N.

Each vertical printed circuit board thus carries preferably at least 20 dipoles, whether staggered as shown or not staggered, and that 18 printed circuit boards in edge-to-edge sectored relationship comprise each circle of printed circuit boards.

Each antenna unit AS is capable of being switched in and out by a respective one or group of PIN diodes under microprocessor control of array control system ACS. More specifically, each of the printed circuit array circles is interconnected by corresponding arrays of horizontal printed circuit boards on which are situated the PIN diodes, which are high speed semiconductor switching devices capable of switching in an out the active elements of the vertical printed circuit boards in the arcuate sectors. More specifically, the PIN diodes used for antenna element switching, as by distributed location within antenna units of the array, may be silicon-based or hybrid or gallium arsenide-based or indium gallium arsenide-based switching diodes as have heretofore proven to be useful for receive/transmit switching and like purposes. they have a current-voltage characteristic exhibiting an abrupt change conductive and nonconductive states, i.e., ON and OFF-states, according to a bias voltage applied to them; and behave like a current controlled RF variable resistor. PIN diodes when off may provide a isolation of typically to 60 dB or more, with useful response extending into gigahertz frequencies. Their use in series or shunt mode for selectively enabling or disabling elements of the new array may be suitably implemented by those skilled in the art.

Said PIN diodes are under microprocessor-driven switching logic control provided by the array control system ACS so as to switch in or out selected active elements or direction finding purposes.

Figure 7:
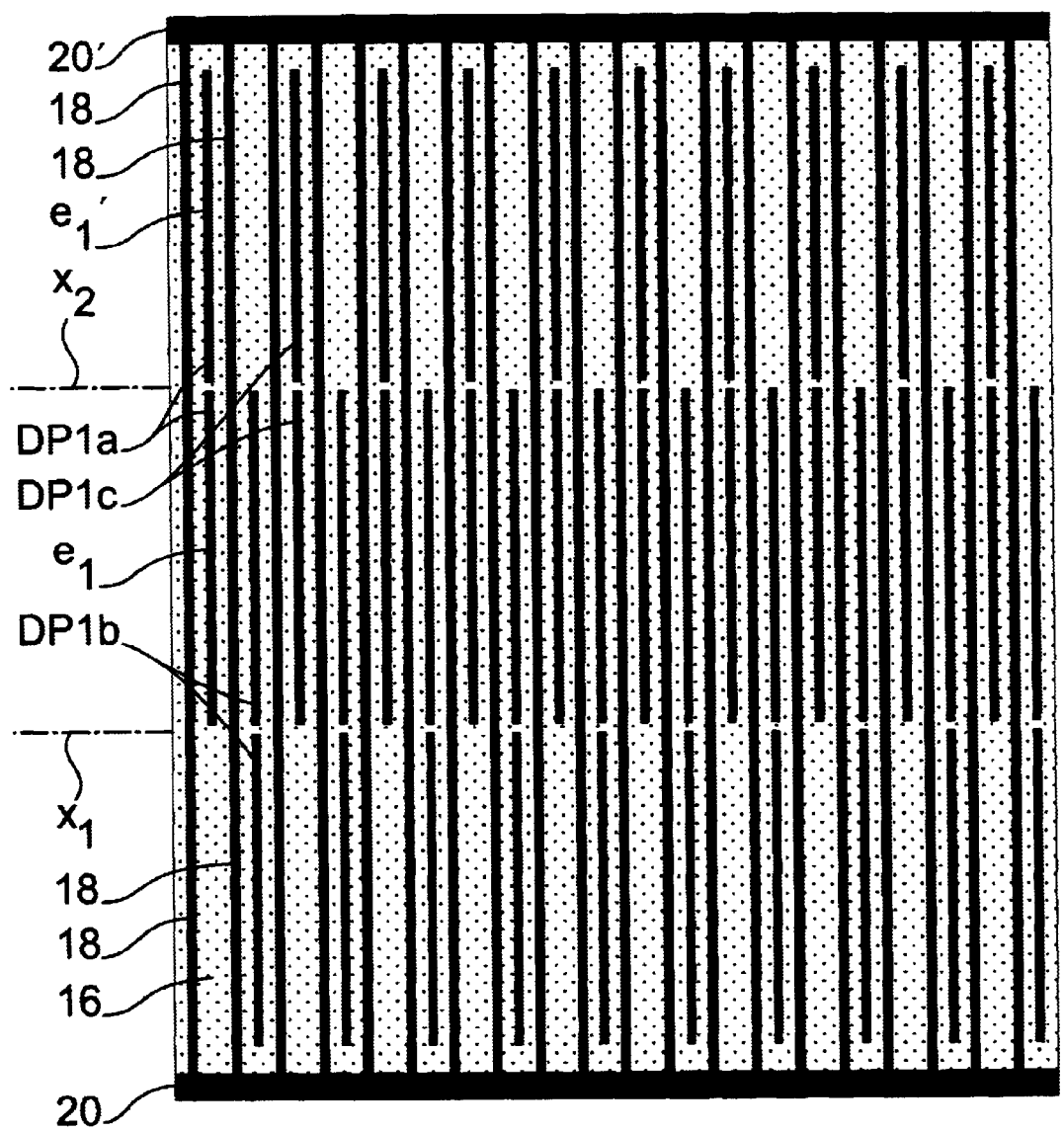
FIG. 7 is a printed circuit board layout showing one possible arrangement of dipolar elements forming portions of antenna units employed in the array, not necessarily to scale, and with some thicknesses exaggerated.

Referring to FIG. 7 the layout of dipolar elements on a printed circuit board which may be representative circuit board PC1, and thus representative of such board within a single sector, being one of those forming ring or bank R1. This figure shows a possible arrangement of the dipolar elements in staggered relation. This drawing is only approximately to scale as thicknesses of metallized areas isolating each pair of dipolar elements are exaggerated. Dipolar pairs DP1a,b, ... h including typical lower and upper dipole elements $e_1$ and $e_1'$ are spaced in parallel but staggered relation. Each dipole pair is separated by identical window-forming metallized areas on the printed circuit board, and a typical window 16 is rectangular and formed of parallel vertical metallized strips 18 which extend between broader horizontal strips 20, 20' at the bottom and top of circuit board PC1. Strips 18 and 20, 20' may be maintained at ground potential. It is then to be understood that dipole pair such as DP1a is electrically isolated by its conductive window 16 from the adjacent dipole pair DP1b, etc., whether selectively enabled or disabled.

FIG. 7 also shows by axes $x_1$ and $x_2$ the levels of midpoints of the dipolar pairs, i.e., the midpoint between the upper and lower electrodes of each dipole, and so also delineate generally the level of circuit boards P1a, P1a' which carry electrical circuits including PIN diodes for switching the antenna units AS and their dipolar pairs between enabled and disabled states during scanning and other modes of use of the system.

Figure 8:
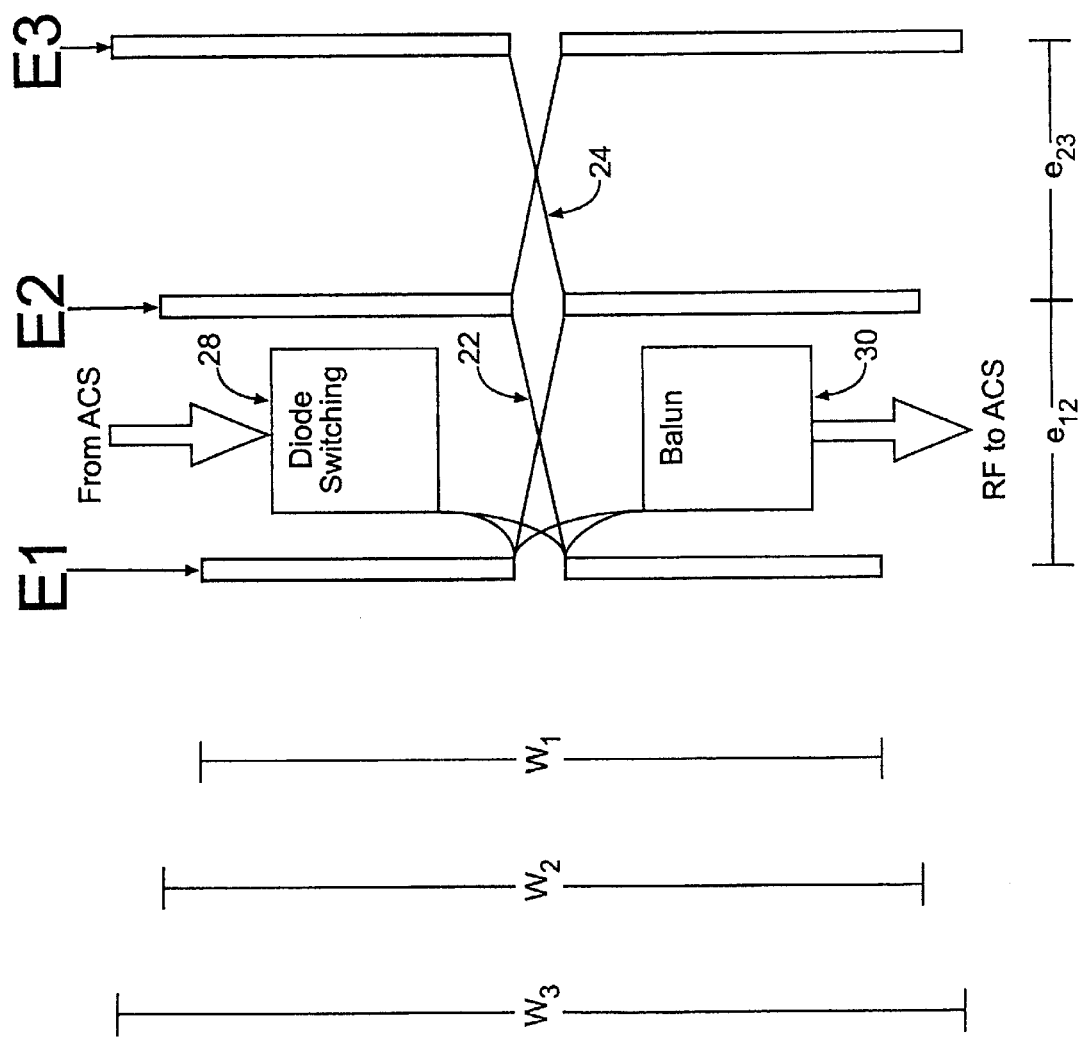
FIG. 8 is a highly simplified an element position illustration showing geometric relationships of elements forming the antenna units.

Referring to FIG. 8, the relationship of elements forming log-periodic antenna units AS is demonstrated for a practical embodiment which is used for demonstrating characteristics of the system. The respective dipolar elements on circuit boards P1, P2, P3, being closely radially aligned to define a respective log-periodic antenna unit $AS_m$, has effectively the operational configuration shown in FIG. 8. Elements in circuit board P1 define lower and upper forward dipole elements $e_1$ and $e_1$', and similarly elements in circuit board P2 define lower and upper central dipole elements $e_2$ and $e_2$'; and so also elements in circuit board P3 define lower and upper rear dipole elements $e_3$ and $e_3$'. These elements are spaced apart by respective spacings $S_{12}$, $S_{23}$. The overall dipole lengths of these pairs of elements are respective $w_1$, $w_2$ and $W_3$. Transposed feedline conductors, i.e., crossed connections 22 and 24, are made between the sets of elements. Preferably, a point of connection, i.e., a feedpoint is defined as indicated at 26 at the shortest, or forwardmost or radially most distant set of elements $e_1$ and $e_1$' and to which is connected a switching PIN diode circuit 28 which receives switching instructions from array control system ACS and from which RF input is provided to an RF input circuit 32. A balun 30 may, if needed, be used adjacent each feedpoint 26 for providing transformation of balanced signal relationships at the feedpoint to unbalanced transmission feedlines, is used, for delivery of received RF signals to array control system ACS.

EXAMPLE 1

In the practical embodiment of FIG. 8, the following table illustrates examples of dimensional relationships. Typical element shape or end effect corrections are not shown.

| Forward Element E1 Length | Central Element E2 Length | Rear Element E3 Length |
|---|---|---|
| 0.85 λ/2 | λ/2 | 1.2 λ/2 |
| Dist. to base 10 center 50 in. (127 cm) typical | Spacing $S_{12}$ from Element E1 0.8 λ/ 4 | Spacing $S_{23}$ from Element E1 0.95 λ/ 4 |

In the table, the symbol λ represents the wavelength of a center frequency or a preferred frequency within the operating band, denoted by gain 3 db endpoints. For a center frequency of 450 MHz, λ=652 mm. [end of Example 1]

Switching circuit 28 may employ switching techniques which are known to those skilled in the art and the circuitry can be located on circuit boards P1a, P1a' which are then interconnected with other components of the array control system ACS module or circuit board 12 located centrally on base 10.

Figure 9:
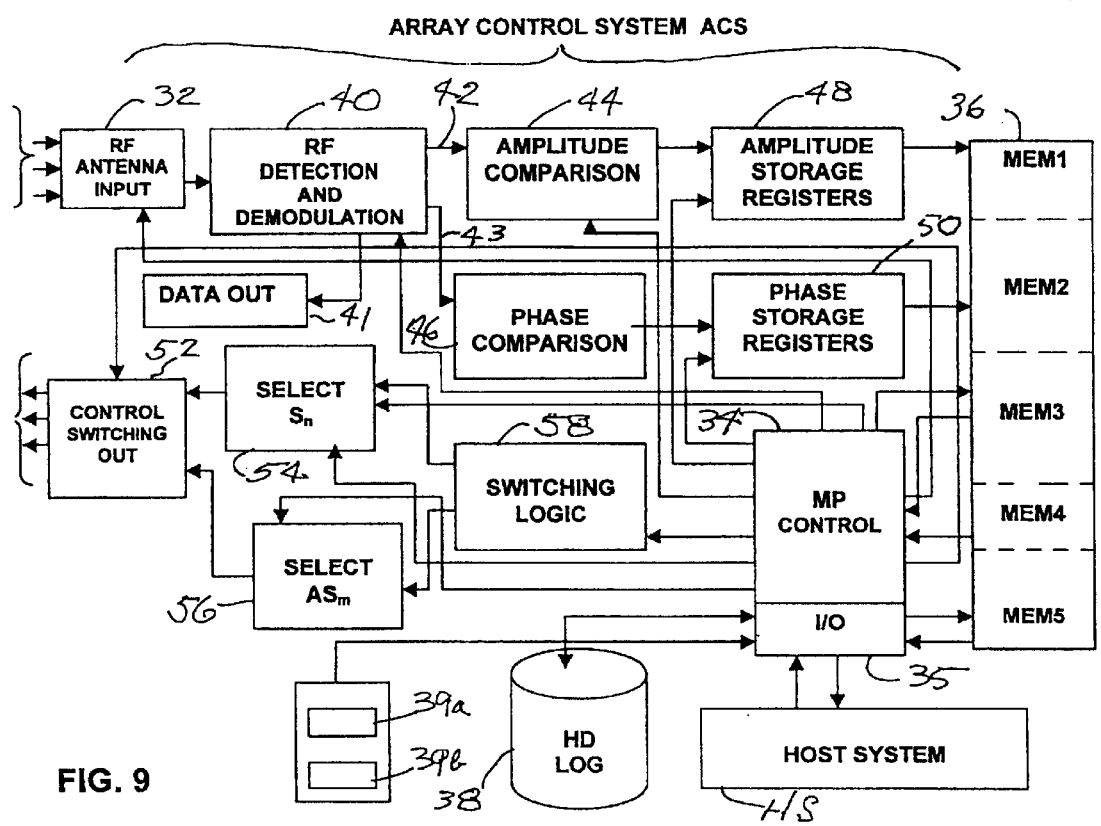
FIG. 9 is a block diagram showing an array control system portion of the new antenna system, as used with the high density multi-element antenna array of FIG. 1.
Figure 10:
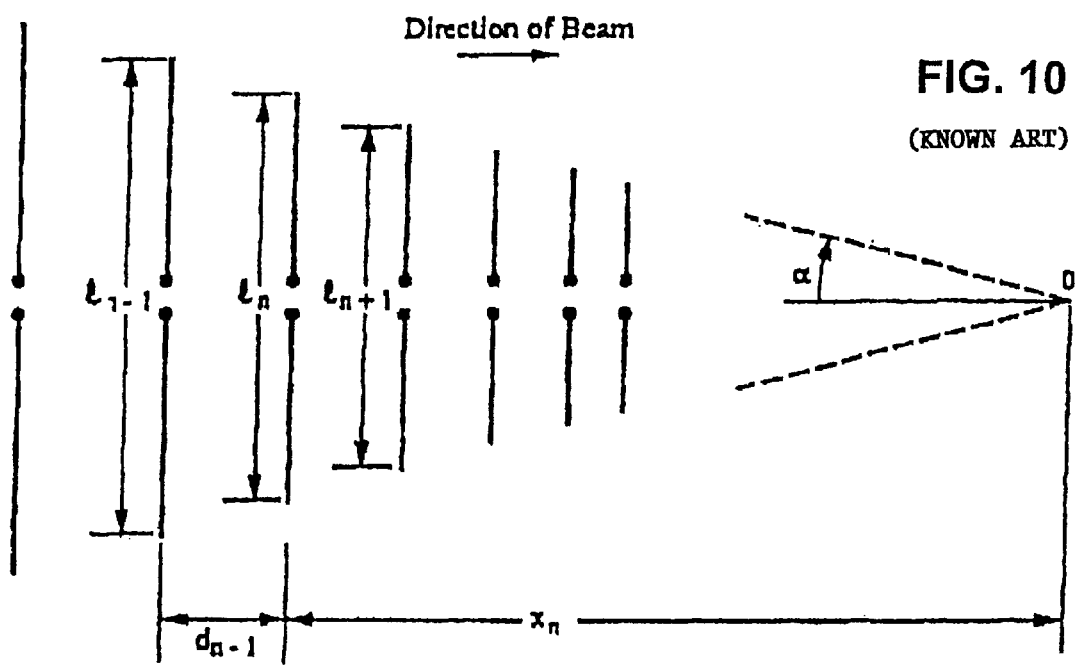
FIG. 10 depicts dimensional relationships of a so-called LPD array according to known theory, being thus labeled "Known Art."
Figure 11:
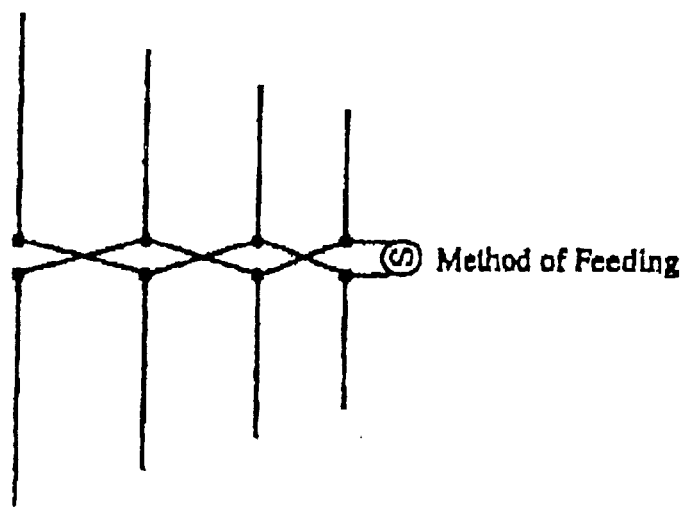
FIG. 11 shows connected dipoles of such LPD array, also labeled "Known Art."

Referring to FIG. 9, array control system ACS is provided with an RF antenna input circuit 32 which receives RF input from each of the antenna units AS. Antenna input circuit 32 may include RF amplifiers, gain limiters, and other specified signal conditioning under the control of a central microprocessor control circuit 34.

Central microprocessor control 34 provides central supervision and control of array control system ACS as may be determined or requested or signaled by host system HS by way of an input-output circuit 35.

Array control system ACS operates in response to a resident instruction set stored in a suitable memory. Such memory is identified by reference character 36 which collectively designates various memories or distinct memory segments required by or used by control 34 for various purposes evident from operational description below.

Also associated with control 34 is a hard drive 38 which may constitute not only a location for program software for operation of the system but also serves as a log for recordation of data and operational status during operation of the system.

The system may also include one or more disk drives such as designated 39a, 39b for receiving system data or program updates, as by use floppy or card drive or PCMCIA or other suitable formats or protocols.

Although control 34 is shown having direct functional interconnections with other components of array control system ACS, it will be understood that data bus connections between the several components are possible and may be preferable. Various communication protocols including LANs are potentially useful, so that the necessary instructions and status reporting, signals and data may be provided by common parallel or serial bus buses or by higher speed bus or communication chain protocols such as SCSI, USB, IEEE 1494 "Fire Wire", IEEE 488 protocol, Ethernet using IP, IP/TCP packet protocol, various IEEE 802 protocols and other communication protocols, all as known, or others in the process of development, by those skilled in art of digital and analog communications.

RF antenna input circuit 32 provides received and conditioned RF signals to an RF detection and demodulation circuit 40 which may have appropriate capabilities including a data output and data storage or communication 41 for auxiliary use of data derived by demodulation of RF signals received from target transmitters, or for correlation with tagging or identification data provided by host system HS, as for confirming that the target transmitter signals are those of a target transmitter tagged by host system HS. Circuit 40 also has a signalling output 42 for providing amplitude-reporting signals indicative of the amplitude of received RF signals during scanning by controlled antenna array CAA as described below. The circuit also includes an output 43 for providing phase-reporting signals indicative of phase relationships of signals received by antenna units AS for purposes explained below.

The amplitude-reporting signals produced by scanning are provided by output 43 to a sector scan comparison circuit 44 operating under the supervision of control 34 to compare the relative amplitudes of signals received either from each of the sectors or from antenna units within each sector.

The phase-reporting signals from scanning are provided by output 42 to a phase comparison circuit or comparator 46 operating under the supervision of control 34 to compare the relative phase relationships between signals received by antenna units within sectors, as later explained.

Identified at 48 and 50 are storage registers selectively enabled by control 34 for temporary storing comparison outputs from comparison circuits 44 and 46, respectively. Memory sections MEM1 and MEM2 are provided for retaining stored outputs when enabled by control 34.

Other memory sections or partitions MEM3, MEM4, MEM5 of memory 36 serve other purposes of the system, including provision for instruction sets, scratch pad memory as well as retaining look-up table data which may represent calibration correction data for calibrating azimuth readings for each sector $S_n$ for purposes discussed below, including both amplitude correction and phase correction data. Such look-up table data may also provide correction for multipath distortion errors or ambiguities.

A control switching output circuit 52 is provided for distributing, under supervision of control 34, appropriate switching instructions to the respective diode circuits 28 in response either to output from a sector $S_n$ selector 54 or from an antenna unit $AS_m$ selector 56. Selector $S_n$ which is an appropriate circuit for identifying a preselected sector or sequence of sectors (as in circular scanning) to be scanned in response to switching logic circuitry 58, while antenna unit $AS_m$ selector 56 is an appropriate circuit for identifying preselected antenna units $AS_m$ or sequence of antenna units $AS_m$ (as in within-sector scanning) to be scanned in response to switching logic circuitry 58. The latter is in turn commanded by control 34, as according to the protocol explained below, and switching logic 58 thus operates to select between sector scanning, in which signal amplitude comparisons are made, and antenna unit scanning in which transition made be made from amplitude comparison to received signal phase comparison.

Modes of Operation

It will be understood from the foregoing that microprocessor control 34 commands switching logic circuit 58 to alternate selectively between amplitude detection (AD) and phase detection (PD) mode modes. In the AD mode the sectors $S_1, S_2, \ldots$, of the array are repeatedly scanned about the complete circle of the array to identify a sector $S_{max}$ of 18 sectors which exhibits the greatest signal strength. That detection then initiates conversion to the PD mode by providing an input then to switching logic 58, causing change of mode from AD to PD mode. When in the PD mode, antenna units AS of opposing sectors of the array are compared in phase relationship. That is, a phase comparison is made between RF signals received by diametrically units in only a pair of opposed arcuate sector of 20 degrees arcuate extent, until a closest possible phase comparison identifies which of the opposed pairs of log-periodic antennas is most closely aligned with the received signal. Directional ambiguities, i.e., forward or reverse along the line of orientation between the opposed pair of antenna units are resolved. The identity of the matched log-periodic antennas is converted to an azimuth for the target signal, either in absolute degrees and/or parts of a degree, representing the bearing to the source transmitting the received signal, either by reference to true north or magnetic north.

When in the AD mode, electronic scanning of the arrayed antenna elements of the present system may, for example, permit, may be carried out at approximately 3000 antenna elements per second, on an element-by-element (e.g., from one log-periodic antenna unit AS to the next). When operating the antenna system in the PD mode, scanning is necessarily somewhat slower, e.g. in the order of 1000 active elements (or log-periodic antenna units AS) per second. Given that there are 360 log-periodic antennas about the full circular extent of the array in the example given, a scan capability of 3000 elements per second corresponds to approximately 1/3000 sec. in which to identify the existence of a received signal as being within a specific sector, but requiring when in the AD mode approximately 1/1000 sec. to determine by phase comparison the specific azimuthal bearing to the target signal source in question. Thus, the system is capable of responding to a target signal which has a transmitting duration of only a fraction of a second assures that a signal will be detected during one circular scan.

The foregoing figures are merely representative, and indicative of a usable operating rate for scanning. The present array can be used at still higher speeds than are set forth herein.

Specific Operation of the System

In general terms, the vertical active elements are selectively operated microprocessor-driven switching logic control of the array control system ACS in two different modes, namely amplitude-determining and phase-comparison modes.

The first mode, which is one of amplitude-determining nature, determines by preferably by sector-by-sector scanning relative amplitude evaluation the existence of a signal within any arcuate sector $S_m$ corresponding to the approximate direction from which a target signal is emanating. This amplitude-determining first scanning mode may be viewed, in effect, as a target acquisition or search mode. It may be triggered by host system HS or may be a default mode initiated by control 34. When enabled, this first mode, effectively an amplitude scanning mode, looks for the existence of a target transmitter $T_n$ which may have been tagged or nominated by host system HS, as according to a predetermined serial number, cellular number, user number, encrypted data, or other predetermined characteristic. Therefore, the data output 41 of detection/demodulator 40 may be provided to host system HS or to known data-matching provision for confirming existence of the tagged or nominated target. Such identity and sector identification (with redundant, repeated sector identification if necessary) occurs at semiconductor switching speeds, set by control 34 and implemented by switching logic 58, and thus occurs in microseconds or milliseconds under worst-case conditions. The microprocessor-driven switching logic control 58 then selects the second mode of operation, in which phase comparison of antenna units AS is made within a sector. Generally stated, phase comparison is made between neighboring ones of the antenna units $AS_m$ within a sector $S_n$ and corresponding diametrically opposite antenna units $AS'_m$ in which the vertical active elements on opposite sides of the circular overall array in a selected opposed pair of vertical arcuate sector printed circuit boards are then compared in electronic phase relationship (i.e., by comparing the E-wave or H-wave phases corresponding to each of a selected pair AP relationship of opposed active elements, to more precisely identify (to a resolution corresponding to the total number of active elements of a circle, whether 360, 720, 1800 or 3600) dictated by the design specification, which will in turn be determined by the site and installation requirements.

More specifically, the following didactic steps illustrate the sequence of operation carried out in scanning, target acquisition, identification and radiolocation of the target or target sources of RF transmissions by radio direction determination using the foregoing modes:

100 Initialize array control system ACS and controlled antenna array CAA.

101 Self-check system circuits.

102 Fetch program files from drive 38 and load to memory 36.

103 Update program files or auxiliary data from hard drives 39a or 39b.

104 Load data including look-up table data of system parameters and error data.

105 Use system parameters and error data to calibrate system.

106 Log system errors and calibrations.

107 Establish protocol with host system HS.

108 Report system status to host system HS.

110 Initiate sector scan by internal scan command if preset; jump to step 120.

111 Wait for sector scan from host system HS if scan command not preset.

112 Initiate sector scan by internal scan command of control if preset.

120 Scan sectors $S_n$ on sector-by-sector basis using a predetermined single antenna unit $AS_m$ or predetermined units $AS_m$ of each sector about 360 degrees of azimuth or a preselected arcuate sector.

121 Detect and demodulate target RF signals if commanded by control 34 in response to nominating or tagging of target source requiring radiolocation.

122 Determine and compare amplitude of RF signals by comparator circuit 44.

123 Hold amplitude comparison data in registers 48.

124 Write amplitude comparison data in registers 48 to MEM1 if commanded for each sector scanned.

125 Check by control 34 stored data for any ambiguity.

126 Repeat steps 121–124 if ambiguity found in step 125.

128 Check look-up table correction data for each sector $S_n$ scanned.

129 Correct stored amplitude comparison data and rewrite to MEM1 if correction required for any sector scanned.

130 Determine maximum signal sector $S_{max}$ of greatest RF amplitude based on stored data.

131 Compare amplitude of sector $S_{max}$ and that of opposite sector $S_{max}'$ to resolve any ambiguity of direction of received RF.

132 Repeat steps 120–131 if ambiguity unresolved or data incoherent or data lacks confidence.

133 Store and log $S_{max}$ and signal amplitude thereof.

134 Convert identify of $S_{max}$ to an azimuth $\Theta_{sector}$.

135 Report azimuth $\Theta_{sector}$ with signal amplitude for $S_{max}$ to host system HS.

136 Report demodulated data to host system HS if requested by it.

138 Repeat steps 120–136 if commanded by host system HS and for possible additional target transmitter source sectors if additional targets nominated or tagged by host system HS.

140 Change from amplitude comparison mode to phase comparison mode.

150 Repeatedly scan sectors antenna units $AS_m$ on unit-by-unit basis within identified maximum sector $S_{max}$.

152 Determine and compare phase relation $\Delta\Phi_{m,m'}$ of RF signals received by each antenna unit $AS_m$ within sector $S_{max}$ and each corresponding opposite unit $AS_m'$ within opposite sector $S_{max}'$ by phase comparator circuit 46.

153 Hold phase comparison data in registers 50.

154 Write amplitude comparison data in registers 50 to MEM2 if commanded for each antenna unit $AS_m$ scanned.

155 Check by control 34 stored data for any ambiguity.

156 Repeat steps 152–154 if ambiguity found.

158 Check look-up table phase correction data for each antenna unit $AS_m$ scanned.

159 Correct stored phase comparison data and rewrite to MEM2 if correction is required for any antenna unit scanned.

160 Determine antenna unit $AS_{max}$ of closest phase match compared to its reciprocal opposite antenna unit $AS_{max}'$ based on stored data so as to identify the closest aligned pair $AS_{max}$–$AS_{max}'$.

161 Compare phase data for antenna units $AS_m$ within sector $S_{max}$ to resolve any phase ambiguity or error resulting from multipath distortion.

164 Revert to amplitude comparison mode.

165 Compare amplitude of signals of aligned pair $AS_{max}$–$AS_{max}'$ to resolve any ambiguity of direction of received RF.

168 Analyze results and data by control 34 under an error-checking protocol to determine if any ambiguity unresolved or data incoherent or data lacks confidence.

170 Repeat steps 160–168 if any ambiguity is unresolved or data is incoherent or data lacks confidence.

172 Store and log identify of antenna unit $AS_{max}$ and signal amplitude thereof.

173 Report data $AS_{max}$ and signal amplitude thereof to control 34.

175 Convert identify of $AS_{max}$ to a target azimuth $\Theta_{Tn}$.

176 Report to target azimuth $\Theta_{Tn}$ host system HS.

177 Continue to report any demodulated data to host system HS if requested

178 Log all data and procedures taken with respect to each target Tn.

180 Repeat steps 120–178 if commanded by host system HS and for possible additional target transmitter sources sector nominated or tagged by host system HS for each target Tn.

182 Return to step 108.

In each of the foregoing procedures, operation is preferably implemented by repetitive scanning and comparisons by amplitude and phase comparison technique and error recalibration procedures so that the new system provides high confidence in all data obtained and reported to host system HS.

If target transmitter distance information is needed by host system HS, distance determinations to the transmitting target transmitter source(s) can be derived by timing relationships, as by host system HS, or by information shared between the array control system ACS and host system HS. This accordingly can allow for r, θ tracking of transmitter locations such as cellular telephone users (or other types of transmitting devices such as for governmental and/or tracking purposes) so as to provide the system with the capability of identifying the location of each user/transmitter, and extracting the position in the form of location data. The location data can then be made available to an existing communication system in order to be capable of being shared with multiple cell sites and reported centrally as for locating to police or emergency equipment the location of the user of cellular equipment.

When host system HS employs multiple sites, namely systems DS1, DS2, . . . , of the present invention each with scanning and direction finding controlled antenna arrays CAA of the present inventive configuration, cross-bearings may also be centrally reported with extremely high precision, as by comparing data from systems DS1, DS2, . . . which all may report to host system HS.

While the system embodiment herein described and illustrated exemplarily uses a unit of 360 log-periodic antennas in 18 sectors, corresponding to azimuth resolution in unit degrees of true (or alternatively magnetic) heading to a transmitting source, a system of the invention may use active elements of such density as to create active antenna units or log-periodic antenna sets or units of even greater density corresponding to still finer increments of resolution such as 0.5 degrees or 0.1 degrees, as may depend upon the number of antenna elements and the spacing between them.

In addition to the foregoing capabilities of providing precision and reliability in the location of users by means of r, θ tracking, it appears that the presently proposed technology should be capable of being further developed to provide what may here be termed r, θ, ρ data, wherein ρ represents an angular component resulting from elevation of a transmitting source such as, merely for example, a cellular user. Thus, in a metropolitan area having multiple-story buildings, in which users may be located not just at ground level, but at various elevations within tall buildings, the inventive system can be implemented to provide data showing the angular elevation correlating, for example, with a specific floor level within a building.

For this purpose, arrayed sectors according to principles of controlled antenna array CAA may be stacked along the central vertical axis in the manner of a wedding case, or in spherical configuration such as suggestive of a geodesic dome, wherein each degree of stacking, or each vertical sector realized by stacked arrays, may be used to derive ρ data, wherein ρ represents the angular component, if any, resulting from elevation of a transmitting source, to supplant r, θ which would otherwise be provided by a horizontal active antenna array as herein described.

Alternatively, the controlled antenna array CAA may be used with one more counterparts designed according the operating principles of controlled antenna array CAA with arcuate sectors or portions of annular sectors, having a central axis of cylindricity or curvature which axis is oriented not vertically but horizontally.

Thus, it is to be understood that the present system is not limited to a horizontal direction finding configuration, as its principles may be incorporated into a direction finding and radiolocation array or arrays having three dimensional character corresponding to x, y and z coordinates or to r, θ, ρ coordinates of a transmitting source relative to the present antenna array.

The presently inventive system is capable of use in radiolocation and direction finding of target transmitters employing various modulation schemes, including FM, AM, SSB, PCM and Spread Spectrum, such as CDMA communication protocols, among others.

In addition to obtaining r, θ data connotating distance and azimuth to a target transmitter, it is possible to augment the system by employing transmitting circuits for causing the array to provide selective scanning transmission for interrogation purposes, for example, for triggering transponder response by the targets for identification and other purposes.

Although the present embodiment is shown as being a completely circular array having three banks or rings of printed circuit boards defining three-element log-periodic configuration for each antenna unit $AS_m$, other numbers of rings, such as four or more, may be implemented according to the design principles of the embodiment.

So also, although a arrangement of mutually concentric rings of element-carrying printed circuit boards is described, arrangements of eccentric sectors are possible, as for specialized use.

It also is to be recognized that controlled antenna arrays of the invention may be constructed which are not fully annular, but instead include only certain arcuate extent less than 360 degrees, such as semicircular, or having arcuate extent less than or greater than 180 degrees. For example, pie-shaped controlled antenna arrays of the invention may be employed where scanning and direction location only within a pie-shaped arcuate extent is required.

Spherical arrangements constructed to utilize the operating principles of controlled antenna array CAA are also possible.

Still other modifications will be possible based upon the present disclosure and inventive principles.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. An active high density multi-element antenna system for radiolocation by identification of the direction of RF radiation from a target source, comprising antenna elements configured in multiple concentric rings about a central axis to define arcuate sectors about the central axis, each of the multiple concentric rings including a plurality of adjacent discrete antenna elements within each sector, the rings having diameter decreasing radially inwardly toward the central axis, each of the elements in the concentric rings have mutual relation to corresponding elements in at least one other of the concentric rings, such that corresponding elements in the multiple rings define respective antenna units which are radial to the central axis, said antenna units being each defined by respective radially corresponding discrete antenna elements in at least two of the multiple concentric rings, the discrete antenna elements constituting each of the antenna units are formed by upright conductive elements for each of the multiple concentric rings, the upright conductive antenna elements for each of the multiple concentric rings being carried by radially spaced printed circuits having surfaces defining the respective rings, each of the antenna units being selectively operatively enabled or selectively operatively disabled in rotational sequence by rotation about the central axis to provide signal selectivity in a narrow beam width defined by the respective radially corresponding antenna units and whereby the selectivity is rotatable about the central axis, feedpoints for each of the antenna units for receiving received RF signals from the respective antenna units when enabled, array means for controllably enabling and disabling the antenna units to cause RF scanning of the antenna units about the central axis and within a least a selected one of the sectors, the array means being operable for identifying which antenna unit within the selected sector is representative of an azimuth representing the direction to the target source.

2. An active high density multi-element antenna system as set forth in claim 1 wherein the multiple concentric rings are at least three in number and are mutually concentric about the central axis, the three rings each being of different diameter with respective diameters within a plane perpendicular to the central axis decreasing radially inwardly toward the central axis.

3. An active high density multi-element antenna system as set forth in claim 2 wherein discrete antenna elements constituting each of the antenna units are relatively dimensioned to be of log-periodic configuration for providing the respective antenna units with substantial forward gain radially outwardly from the central axis.

4. An active high density multi-element antenna system as set forth in claim 1 wherein the conductive antenna elements for each ring are discrete metallized areas on arrays of printed circuit boards each having a surface through which a radius extends perpendicularly from the central axis.

5. An active high density multi-element antenna system as set forth in claim 4 wherein the printed circuit boards are planar.

6. An active high density multi-element antenna system as set forth in claim 4 wherein the printed circuit boards are arcuate relative to the central axis.

7. An active high density multi-element antenna system as set forth in claim 4 wherein the printed circuit boards are located edge-to-edge in each of the three rings.

8. An active high density multi-element antenna system as set forth in claim 6 wherein the conductive antenna elements are mutually adjacent, dipolar and have an axis of elongation parallel to the central axis.

9. An active high density multi-element antenna system as set forth in claim 8 wherein each of the antenna units from adjacent antenna units, the printed circuit boards carrying the conductive antenna elements include also conductive isolation elements.

10. An active high density multi-element antenna system as set forth in claim 4 wherein the arcuate sectors each includes at least one printed circuit board.

11. An active high density multi-element antenna system as set forth in claim 3 wherein conductive antenna elements forming each of the antenna units are formed by dipolar conductive elements to provide at least a first element, a second element, and a third element, wherein the first element is that of greatest distance from the central axis, and wherein the first, second, and third elements are respectively of electrical length $0.85\lambda$, $\lambda$ and $1.2\lambda$, the radial spacing between the forward and central elements is $0.4\lambda/4$ and the radial spacing between the central and rear elements is $0.95\lambda/4$, where $\lambda$ is the fundamental wavelength of a center frequency or a preferred frequency within an operating band for such array, denoted by gain 3 db endpoints, and where the element lengths of the first, second and third elements may be corrected in accordance with antenna design principles.

12. An active high density multi-element antenna system for radiolocation by identification of the direction of RF radiation from one or more target sources, comprising antenna elements configured in multiple concentric rings about a central axis to define arcuate sectors about the central axis, the rings having diameter decreasing radially inwardly toward the central axis, each of the rings including a plurality of adjacent discrete antenna elements within each sector, each of the elements in the concentric rings have mutual relation to radially corresponding elements in at least one other of the concentric rings, such that the radially corresponding elements in the multiple rings define respective antenna units which are radial to the central axis, each of the antenna units being selectively operatively enabled or selectively operatively disabled in rotational sequence about the central axis to provide signal selectivity in a narrow beam width defined by the respective antenna units and whereby the selectivity is rotatable about the central axis, means for electrically isolating each of the antenna units from adjacent antenna units, feedpoints for each of the antenna units for receiving received RF signals from the respective antenna units when enabled, an array control system for causing RF scanning of the antenna units about the central axis within a least a selected one of the sectors, the array means being operable for identifying which antenna unit within the selected sector is representative of an azimuth representing the direction to the target source, wherein the array control system scans for a target transmitter source by scanning within preselected sectors in amplitude-determining mode, by sector-by-sector scanning of relative amplitude evaluation, a received signal within any one of the preselected sectors, to identify a maximum signal sector, and then converts to a second mode for identifying which of the antenna units within the maximum signal sector is representative of an azimuth representing the direction to the target source.

13. An active high density multi-element antenna system as set forth in claim 12 wherein the scanning by the array control system is effected by controllably enabling and disabling the antenna units within all or less than all of the sectors.

14. An active high density multi-element antenna system as set forth in claim 13 wherein the antenna units are selectively enabled or disabled by diode switching by switching circuits of the control system interconnected with the antenna units.

15. An active high density multi-element antenna system as set forth in claim 12 wherein the second mode provides received phase comparison of RF signals received by antenna units within the maximum signal sector.

16. An active high density multi-element antenna system as set forth in claim 15 wherein the array control system provides said phase comparison between neighboring ones of the antenna units within the maximum signal sector and radially corresponding diametrically opposite antenna units relative to the central axis on opposite sides of the array.

17. An active high density multi-element antenna system as set forth in claim 12 wherein the array control system includes provision for resolving directional ambiguities, forward or reverse along a line of orientation through the central axis between the opposed pair of antenna units.

18. A method of scanning and radiolocation of one or more target sources of RF radiation comprising:

providing a high density multi-element antenna system having antenna elements configured in multiple concentric rings about a central axis to define arcuate sectors about the central axis, wherein the rings having diameter decreasing radially inwardly toward the central axis, the rings including a plurality of adjacent discrete antenna elements within each sector, and each of the elements in the concentric rings have mutual relation to radially corresponding elements in at least one other of the concentric rings, such that radially corresponding elements in the multiple rings define respective antenna units which are radial to the central axis, and an array control system therefor, operating the control system to provide at least:

first mode scanning of the antenna units about the central axis in a received RF amplitude sensing mode within a least a selected one or more of the sectors selectively operatively enabling or selectively operatively disabling the antenna units in rotational sequence about the central axis to provide signal selectivity in a narrow beam width defined by the respective antenna units and whereby the selectivity is rotatable about the central axis, and second mode scanning of the antenna units about the central axis in a received RF phase sensing mode within a least a selected one or more of the sectors operating the control system to provide identification of which antenna unit within the selected sector is most closely representative of an azimuth representing the direction to the target source.

19. A method of scanning and radiolocation of one more target sources of RF radiation as set forth in claim 17 further comprising alternating between the first and second modes.

20. A method of scanning and radiolocation of one or more target sources of RF radiation as set forth in claim 17 comprising scanning sectors of the array in such a way as to scan one or more times about the complete circle of the array in the amplitude sensing mode to identify a maximum signal sector, then converting to said second mode scanning, and therein comparing received signal phase as between diametrically opposed pair antenna units until a closest possible phase comparison identifies which of the opposed pairs of antenna units is most closely aligned with the received signal.

21. A method of scanning and radiolocation of one or more target sources of RF radiation as set forth in claim 20 further comprising comparing received signal amplitude of the opposed pairs of antenna units most closely aligned with the received signal to resolve forward or reverse directional ambiguities along a line of orientation between the opposed pair of antenna units.

22. A method of scanning and radiolocation of one more target sources of RF radiation as set forth in claim 20 wherein in scanning sectors of the array the complete circle of the array in the amplitude sensing mode only one antenna unit of each sector is selectively enabled.

23. A method of scanning and radiolocation of one or more target sources of RF radiation as set forth in claim 20 wherein when in phase comparison mode, the received signal of each antenna unit with the maximum sector is compared with the received signal of each antenna unit diametrically opposed thereto relative to the central axis.

24. A method of scanning and radiolocation of one or more target sources of RF radiation as set forth in claim 20 wherein at least one of the first and second modes of scanning further using error-checking protocol under processor control to determine if any ambiguity unresolved or data incoherent or data lacks confidence, and repeating the first and second modes of scanning if error is detected.

25. A method of scanning and radiolocation of one or more target sources of RF radiation as set forth in claim 20 comprising repeatedly alternating between the first and second modes of scanning for each of successive target transmitters and electronically storing data relative to the radiolocation of successive target transmitters.

26. A method of scanning and radiolocation on one or more target sources of RF radiation as set forth in claim 20 comprising operating the array control system under processor control without human intervention.

27. A method of scanning and radiolocation of one or more target sources of RF radiation as set forth in claim 20 comprising operating the array control system in response to a host system.

28. A method of scanning and radiolocation of one or more target sources of RF radiation as set forth in claim 20 comprising using the array control system to detect and demodulate data received from target transmitters.

* * * * *